United States Patent
Rodriguez et al.

(10) Patent No.: US 6,996,395 B2
(45) Date of Patent: Feb. 7, 2006

(54) VOICEMAIL MESSAGING VIA SATELLITE RADIO

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 217 days.

(21) Appl. No.: 10/718,090

(22) Filed: Nov. 20, 2003

(65) Prior Publication Data
US 2005/0113072 A1 May 26, 2005

(51) Int. Cl.
*H04M 11/10* (2006.01)

(52) U.S. Cl. ............... 455/412.2; 455/413; 379/88.26; 379/88.16; 379/88.25

(58) Field of Classification Search ........ 455/419–420, 455/413, 412.2, 412.1, 11.1, 12.1, 13.1, 13.4, 455/3.02, 3.06, 66.7, 41.2, 41.3; 379/41, 379/42, 51, 68, 85
See application file for complete search history.

(56) References Cited

U.S. PATENT DOCUMENTS

| | | | |
|---|---|---|---|
| 5,396,540 A | 3/1995 | Gooch | |
| 5,564,076 A | 10/1996 | Auvray | |
| 6,246,672 B1 | 6/2001 | Lumelsky | |
| 6,278,704 B1 | 8/2001 | Creamer et al. | |
| 6,278,861 B1 | 8/2001 | Ward et al. | |
| 6,343,119 B1 | 1/2002 | Creamer et al. | |
| 6,389,276 B1 * | 5/2002 | Brilla et al. | 455/413 |
| 6,397,076 B1 * | 5/2002 | Brown et al. | 455/521 |
| 6,493,546 B2 | 12/2002 | Patsiokas | |
| 6,510,317 B1 | 1/2003 | Marko et al. | |
| 6,549,774 B1 | 4/2003 | Titlebaum et al. | |
| 6,553,077 B2 | 4/2003 | Rindsberg et al. | |
| 6,614,797 B1 | 9/2003 | Hippelainen | |
| 2002/0002039 A1 | 1/2002 | Qureshey et al. | |
| 2002/0013149 A1 | 1/2002 | Threadgill et al. | |
| 2002/0028655 A1 * | 3/2002 | Rosener et al. | 455/16 |
| 2002/0028665 A1 | 3/2002 | Mankovitz | |
| 2002/0072389 A1 | 6/2002 | Ward et al. | |
| 2003/0087636 A1 | 5/2003 | Mazzara et al. | |

OTHER PUBLICATIONS

Earl Eldgridge, *Drivers Time in Satellite Radio*, USAToday.com, Jan. 23, 2002.

(Continued)

*Primary Examiner*—Rafael Perez-Gutierrez
*Assistant Examiner*—Emem Ekong
(74) *Attorney, Agent, or Firm*—Marilyn S. Dawkins; Dillon & Yudell LLP (57) ABSTRACT

A method and device for receiving a voice mail from a cellular phone service provider utilizing a satellite radio. When the cellular phone service provider determines that a called party's cellular phone is unable to receive a call because the called cellular phone is not within a live cell, the calling party is prompted to leave a voice mail message. The voice mail message is uplinked to a space satellite, which transponds the message to a one-way satellite radio receiver. The radio receiver sends the voice mail message to a coupled recorder. A repeater, coupled to the recorder, then transmits the voice mail message to the called cellular phone to a highly limited zone. The called party's cellular phone then receives the voice mail message as if it were one-way cellular phone call.

19 Claims, 9 Drawing Sheets

OTHER PUBLICATIONS

Robert Fenichel, *DBS Could Provide Nationwide Coverage for NS/EP Issues*, www.ncs.gov, Oct. 5, 2000.

P.S. Cohen and E.B. Sherwin, Jr., *Portable, Speech-Activated, Electronic Mail System*, IBM Technical Disclosure Bulletin, vol. 38, No. 07, Jul. 1995, pp. 537-538.

* cited by examiner

VOICEMAIL MESSAGING VIA SATELLITE RADIO

BACKGROUND OF THE INVENTION

1. Technical Field

The present invention relates in general to the field of telecommunications, and in particularly voice mail messages. Still more particularly, the present invention relates to a method and apparatus for receiving voice mail messages using a satellite radio coupled to a repeater, allowing voice mail messages to be received on a cellular phone when the cellular phone is out of range of a cellular base station.

2. Description of the Related Art

Cellular phones, which blend radio and telephone technology, have become ubiquitous throughout the world. As the name implies, a cellular phone is a phone that works within a "cell," which is an area surrounding a base station transceiver that sends and receives radiotelephone traffic to the cellular phone. Each cell is of limited size, typically about 10 square miles, with the base station transceiver being in the center of the cell. By being so small, the cellular phone only has to transmit at low power (either 0.6 watts or 3.0 watts of power), which results in extended battery life.

Multiple cells are contiguous, overlapping only enough to allow a call to be handed off from one cell to another. As the user of the cellular phone moves out of a first cell into a second cell, as in when driving in a car, service to the cellular phone is passed from the tower in the first cell to the tower in the second cell, allowing the user to continue her call without a break in service.

When a user turns on her cellular phone, the cellular phone first listens for a System Identification Code (SID) on a control channel. The control channel is a special frequency channel that provides instructions to the cellular phone to set up calls, including channel protocols, handoff procedures, etc. Also set up are transmission protocols to be used, such as frequency division multiple access (FDMA), time division multiple access (TDMA), code division multiple access (CDMA), etc.

If the cellular phone is not within a cell, that is, if the cellular phone is not within a transmission range of a base station transceiver, then the cellular phone is said to be in a "dead cell," and no cellular telephone traffic is possible within that dead cell. When this occurs, telephone calls sent to the cellular phone, either from another cellular phone or a land-line (plain old telephone server—POTS) phone, are unable to be completed. Typically, the caller receives a message stating that the cellular phone being called is not available, due to the called cellular phone being in a dead cell, the called cellular phone already handling another call, or the called cellular phone being turned off. Whatever the reason for the call not being able to go through, a same option is offered to the caller to leave a voice mail message for the user of the called cellular phone.

A voice mail service offered by a cellular phone service provider is a combination of an answering machine and a pager. That is, the caller's voice message is recorded ("answering machine"), and the called party is then alerted ("paged") that she has a new voice message if the cellular phone is not in a dead cell. Thus, the called party can listen to the message at a convenient future time. Typically, the called party is alerted to the presence of a new voice mail message with a data signal. That is, a typed message stating "New Voice Mail Received" will appear on a display of the cellular phone. The called party then calls her own cellular phone number, enters a personal password number, and then listens to the new voice mail.

If the called party is in a dead cell, then the voice mail service cannot contact the called party to alert her of the missed telephone call and stored voice mail message. In such a situation, then, the cellular phone service provider monitors traffic from base stations until notified that the called party is back in a "live" cell. The service provider then sends the called cellular phone the prompt alerting the user of the new voice mail message.

However, voice mail messages are often urgent, and the called cellular phone may be outside any live cell for an extended period of time. For example, consider a user of the called cellular phone who is driving through a desolate stretch of road far from civilization, where cellular coverage is spotty at best. Similarly, a user may simply be in an area for several hours or days where there is no cellular phone service. In such instances, the user cannot be notified that she has a new voice mail message.

What is needed, therefore, is a method and system that allows a cellular phone user to receive a voice mail message when outside of a live cell zone. Such a method and system would preferably utilize commonly available equipment combined with a minimal amount of hardware modification.

SUMMARY OF THE INVENTION

The present invention is therefore directed to a method and device for receiving a voice mail from a cellular phone service provider utilizing a satellite radio. When the cellular phone service provider determines that a called party's cellular phone is unable to receive a call because the called cellular phone is not within a live cell, the calling party is prompted to leave a voice mail message. The voice mail message is uplinked to a space satellite, which transponds the message to a one-way satellite radio receiver. The radio receiver sends the voice mail message to a coupled recorder. A repeater, coupled to the recorder, then transmits the voice mail message to the called cellular phone to a highly limited zone. The called party's cellular phone then receives the voice mail message as if it were a regular cellular phone call, albeit only one-way.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF A PREFERRED EMBODIMENT

Figure 1:
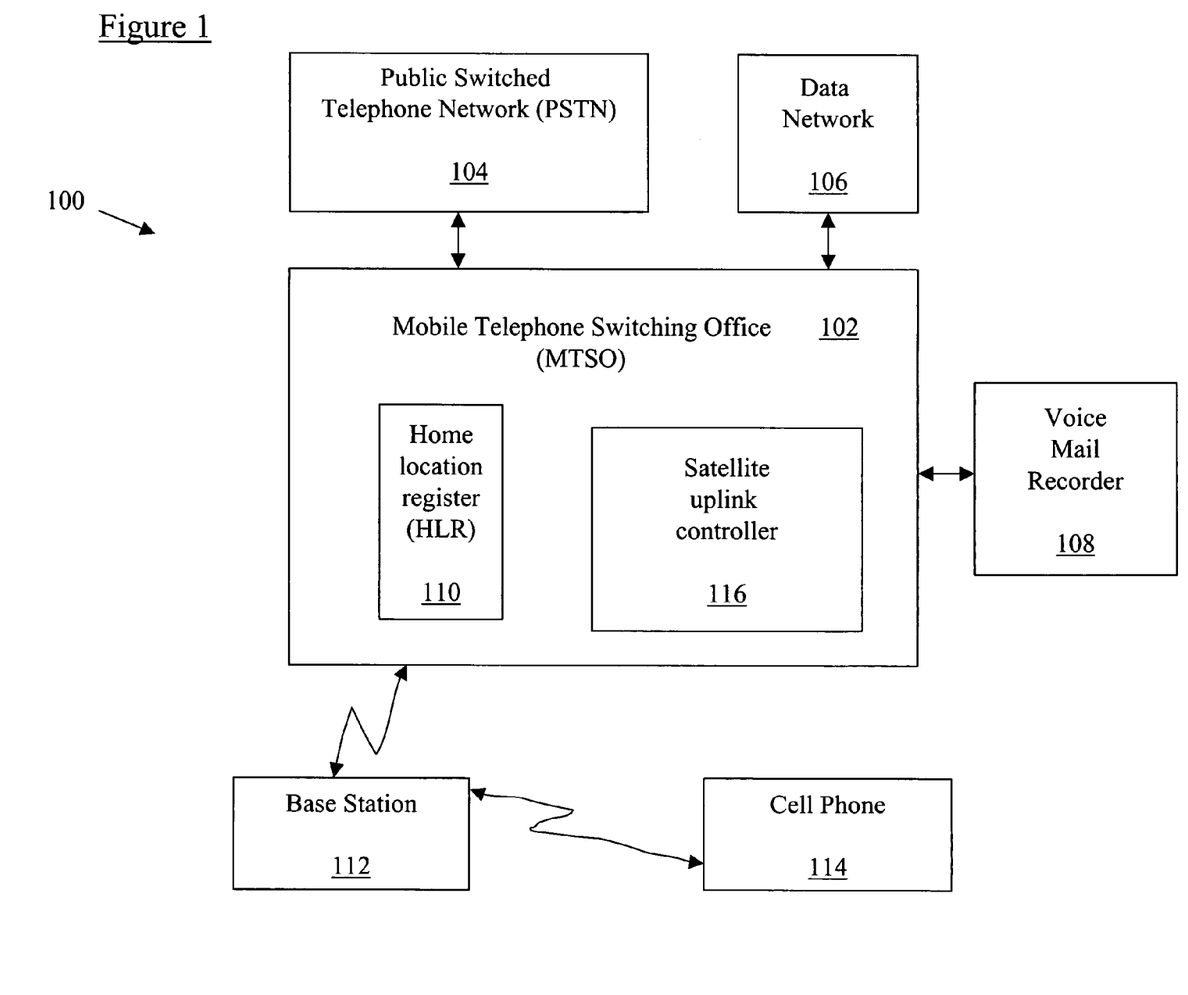
FIG. 1 depicts a modified cellular phone system incorporating a satellite uplink controller for transmitting a voice mail message to a telecommunications satellite transponder.

With reference now to FIG. 1, there is depicted a block diagram of an exemplary cellular phone system 100 used in the present invention. The heart of cellular phone system 100 is a mobile telephone switching office (MTSO) 102, which performs multiple functions to facilitate connecting a call and/or voice message to a subscriber's cellular phone 114 as known to those skilled in the art. A part of this facilitation includes tracking where the subscriber's cellular phone 114 is physically located in real time by monitoring mobile identification numbers (MINs) reported by base stations 112 and other MTSO's 102.

When cellular phone 114 is turned on or enters a new cell, cellular phone 114 listens for a system identification code (SID) from base station 112. If the SID matches the SID programmed into cellular phone 114, then cellular phone 114 knows that it is within a cell belonging to the service provider with which cellular phone 114 is registered. If the SID does not match, the cellular phone 114 knows that it is in a "roam" mode, in which it is a guest of another service provider. In either event, cellular phone 114 transmits a registration request, which includes the mobile identification number (MIN) of cellular phone 114, which is a 10 digit number derived from the phone number of cellular phone 114. The registration request includes a command to let the home MTSO 102 know which cell the cellular phone 114 is situated in. This location information is transmitted to and saved in home location register (HLR) 110. As cellular phone 114 moves to new cells, or if cellular phone 114 loses communication contact with a base station 112, the HLR 110 is updated, so that MTSO 102 knows the location and availability of cellular phone 114 at all times.

Besides knowing where cellular phone 114 is located, MTSO 102 also provides an interface with a public switched telephone network (PSTN) 104 and a data network 106. PSTN 104 is a public switching system, which connects to both land-line telephones as well as other cellular phones (not shown). When another phone, either land based or cellular, wishes to call cellular phone 114, the call is switched through PSTN 104 and routed to MTSO 102. Similarly, if a user or cell application program (CAP), webpage, or other packet based data, then data network 106, preferably the Internet, provides the requisite data for such communications. The data is sent to MTSO 102 in packet form, such as in an Internet Protocol (IP) format, to MTSO 102, which then forwards the packet(s) to cellular phone 114, if Internet enabled.

If an outside caller is unable to connect with cellular phone 114, because cellular phone 114 is busy, turned off, or not within a live cell, then the caller is prompted to leave a voice mail message, which is recorded on a voice mail recorder 108. As will be discussed in further detail below, the voice mail message is first sent to cellular phone 114 using traditional voice mail procedures (sending a prompt to cellular phone 114 inviting the user of cellular phone 114 to call in to listen to her voice messages).

Figure 2:
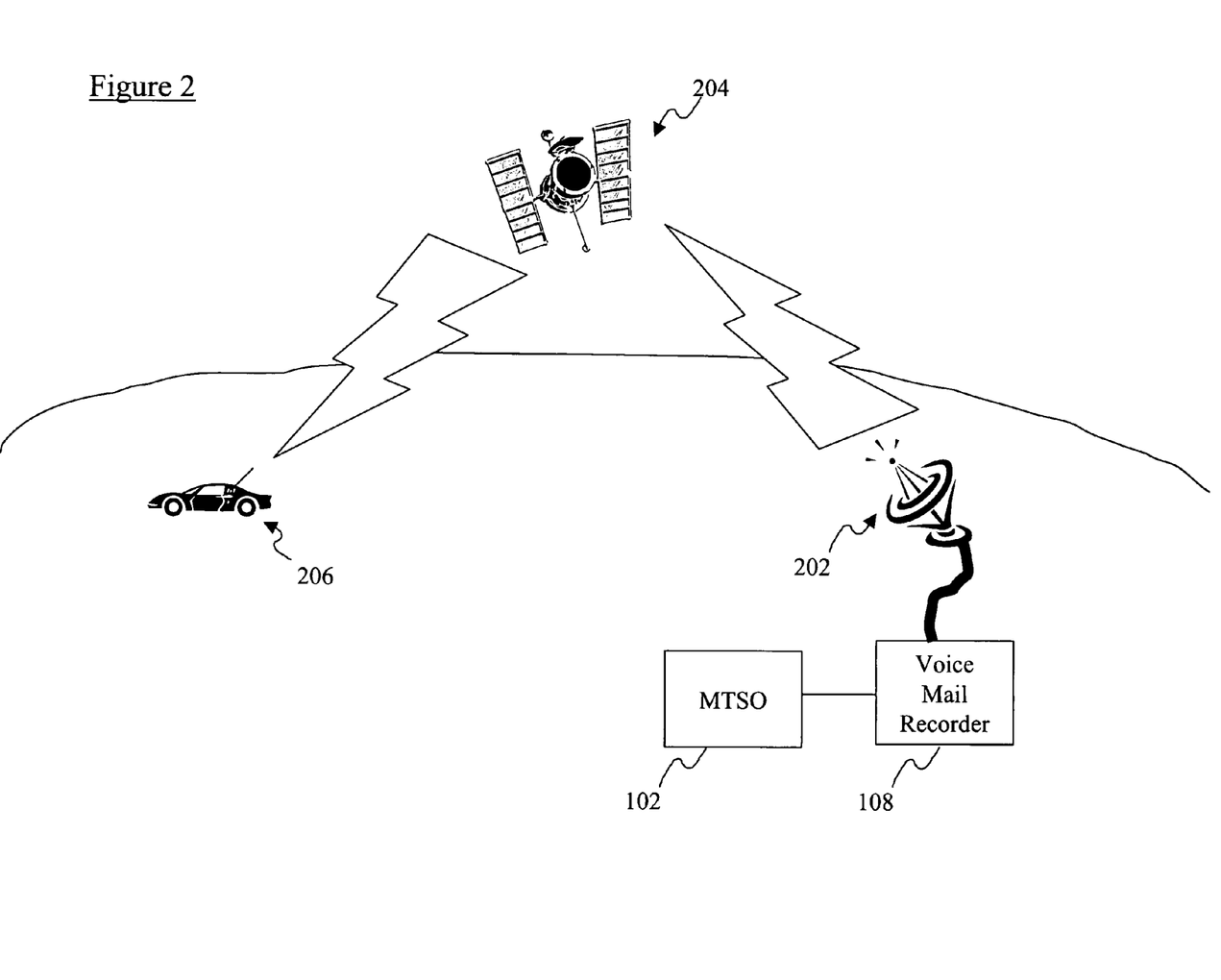
FIG. 2 illustrates the telecommunications satellite transponder sending the voice mail message to a user.

However, if cellular phone 114 is not in communication with a base station 112 (i.e., is in a dead cell), then the recorded voice mail message is uplinked to a space satellite transponder under the control of a satellite uplink controller 116 in MTSO 102. With reference then to FIG. 2, the voice mail message stored in voice mail recorder 108, which is under the control of MTSO 102, is sent to uplink transmitter 202. Uplink transmitter 202 transmits the voice mail message to a satellite transponder 204 located in a geosynchronous Earth orbit. In the preferred embodiment of the present invention, satellite transponder 204 is dedicated, at least primarily, to transmitting commercial radio broadcasts to a satellite radio receiver located in the presence of a user, such as in a car 206.

Figure 3A:
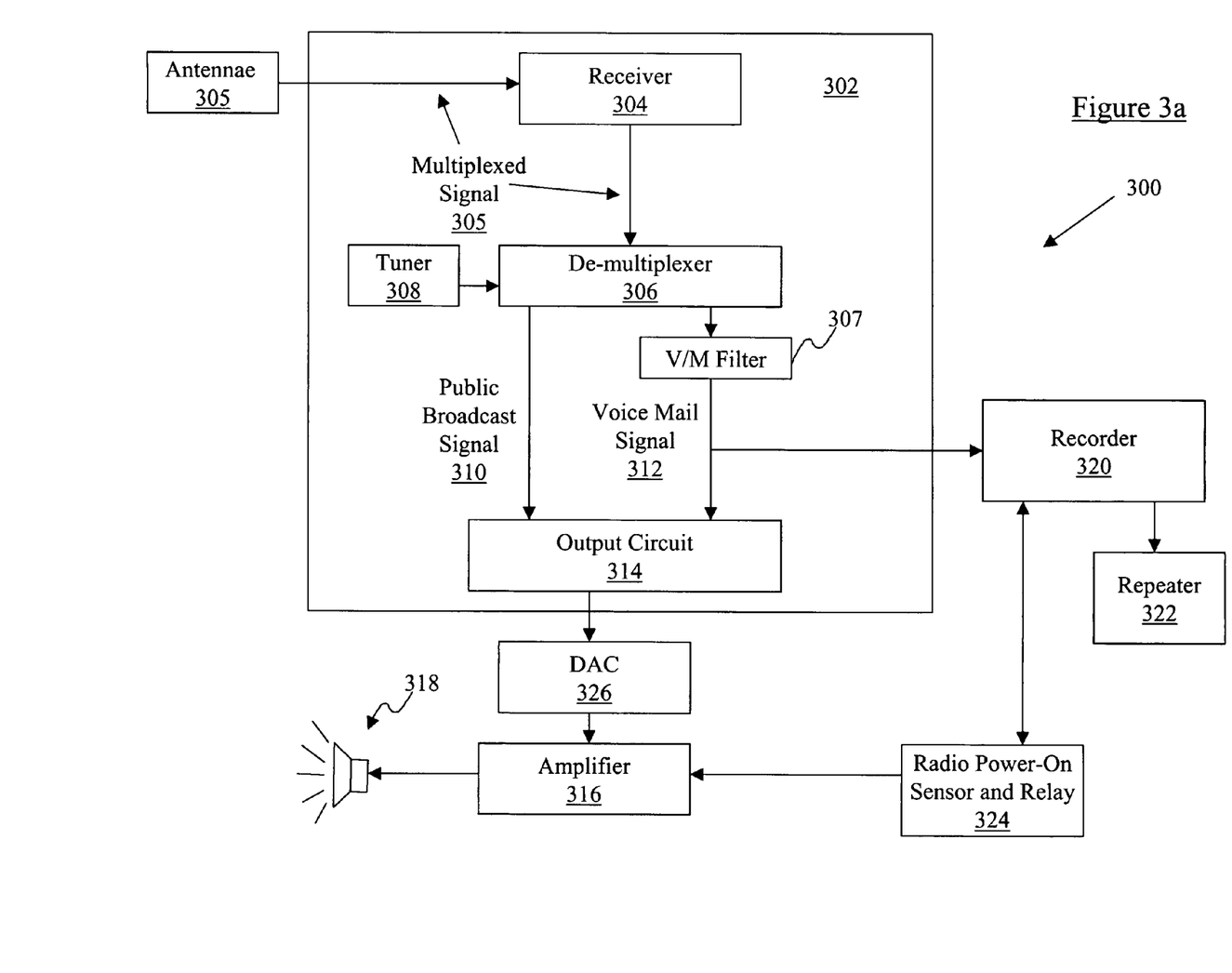
FIG. 3a depicts details of a voice mail receiver utilizing a modified satellite radio receiver.

With reference now to FIG. 3a, there is depicted a block diagram of a voice mail receiver 300 that incorporates a satellite radio 302. Satellite radio 302 is preferably designed to be capable of receiving radio signals from satellite transponder 204, so that the present invention can utilize such commercially available radios. That is, satellite radio 302 is not a two-way satellite radio or radio telephone, but rather is a radio designed to only receive signals from satellite transponder 204.

Satellite radio 302 includes a receiver 304, which is capable of receiving a plurality of multiplexed radio signals from satellite transponder 204 via an antennae 305. The multiplexed radio signals are then sent to a demultiplexer 306, which demultiplexes and selects a particular public broadcast signal 310 according to a select input from a digital tuner 308. In a preferred embodiment, a voice mail signal 312 is always selected as a fixed output from demultiplexer 306 as shown.

Public broadcast signal 310 is sent to an output circuit 314, which removes "noise" from the signal, preferably through bandpass filters (not shown), and then passes public broadcast signal 310 to a signal digital-to-analog converter (DAC) decoder 326, which the passes a decoded analog signal to an amplifier 316. Amplifier 316 passes the amplified decoded broadcast signal 310 on to a speaker 318, allowing broadcast signal 310 to be heard by a listener, assuming satellite radio 302 and decoder 326 and amplifier 316 are powered up. Note that in FIG. 3, amplifier 316 is depicted for purposes of clarity as being separate from satellite radio 302. However, it is understood to be within the scope of the present disclosure that amplifier 316 may be an integral component of satellite radio 302.

As shown, voice mail signal 312 is sent to a voice mail (V/M) filter 307, which compares the destination identifier of the called cellular phone with a cellular phone associated with the satellite radio 302. V/M filter 307 discards (disregards) any voice mail message whose destination cellular phone number does not match an authorized cellular phone number listed in V/M filter 307 or another memory accessible by V/M filter 307. If the voice mail message is authorized, then it is sent to a recorder 320. Recorder 320 is a digital recorder, preferably a high-speed dynamic random access memory (DRAM) incorporating caching and high-speed secondary non-volatile storage, or alternatively a static random access memory (SRAM) as known to those skilled in the art of digital storage technology.

After being recorded in recorder 320, voice mail message 312 is sent to a repeater 322, which re-broadcasts voice mail message 312 to a local cellular phone, as described in detail below.

Voice mail message 312 is also sent to a radio power-on sensor and relay 324. As described in detail below, a secondary method of broadcasting voice mail message 312 is afforded through sensor and relay 324. Sensor and relay 324 includes a sensor that monitors whether satellite radio 302 is turned off when voice mail signal 312 is received at receiver 304. If satellite radio 302 is in fact turned off when voice mail signal 312 is received, then when satellite radio 302 is turned back on, sensor and relay 324 sends a command back to recorder 320 to resend voice mail signal 312 to sensor and relay 324. Sensor and relay 324 then relays voice message 312 on to amplifier 316, such that voice mail message 312 is automatically played through speaker 318 when satellite radio 302 is turned back on.

Figure 3B:
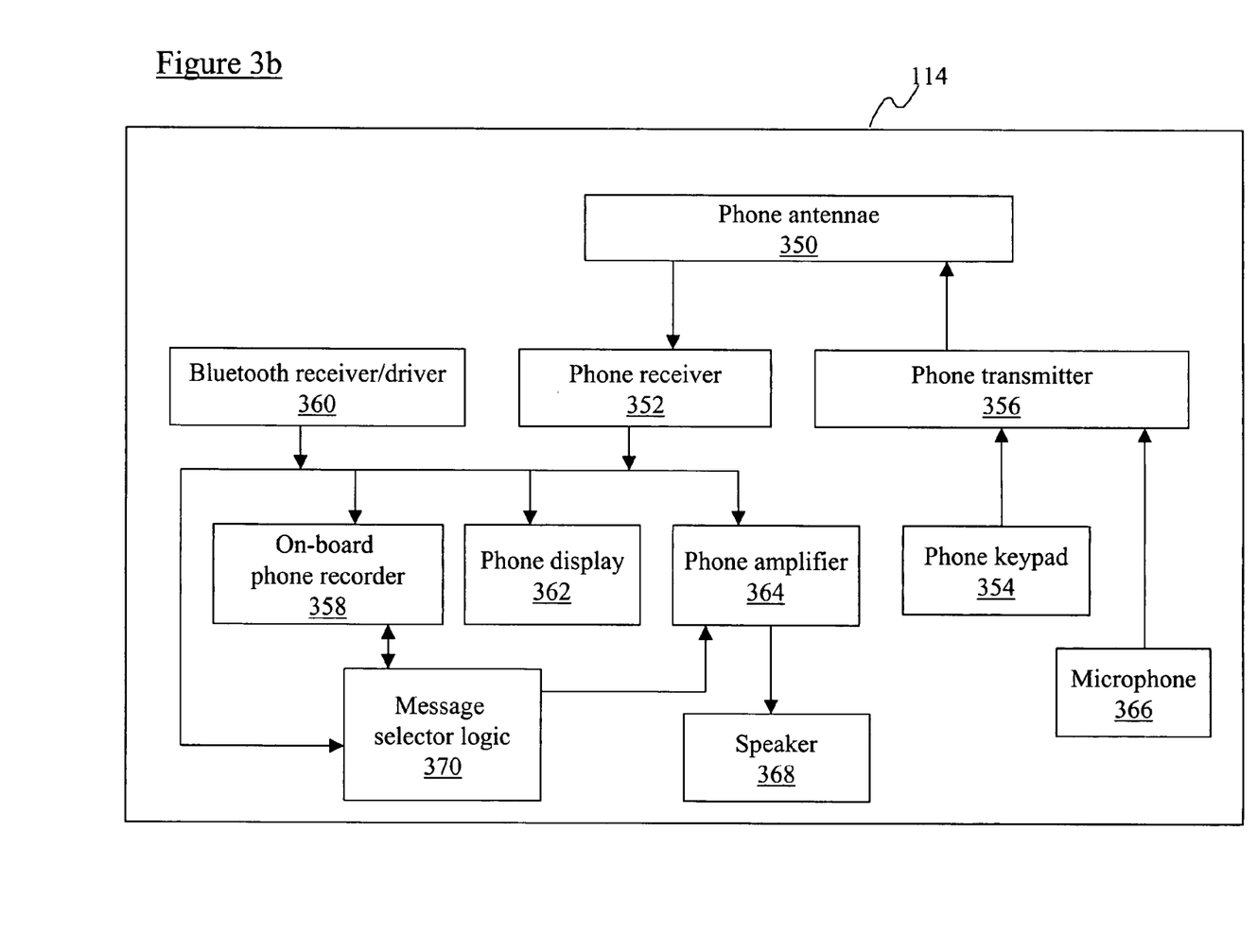
FIG. 3b depicts a cellular phone capable of recording voice mail messages according to a preferred embodiment of the present invention.

Referring now to FIG. 3b, there is depicted a block diagram of a preferred embodiment of cellular phone 114. Cellular phone 114 receives and transmits signals via a phone antennae 350, which passes received signals to a phone receiver 352 and transmits signals from a phone transmitter 356, which receives inputs from a phone keypad 354 and a microphone 366 (via related circuitry that is not depicted). Received signals that are received by either phone receiver 352 or a Bluetooth receiver/driver 360 are then sent to an on-board phone recorder 358, a phone display 362 and/or a phone amplifier 364, which has an associated speaker 368. If the received signal is a voice mail message, it is recorded in on-board phone recorder 358 under the control of a message selector logic 370, which controls a recording of only authorized voice mail messages. Message selector logic 370 also transmits authorized voice mail messages to phone amplifier 364 when selected by a user to be played. Note that on-board phone recorder 358 can also record voice mail messages that are received directly from a base station 112, as shown in FIG. 1, assuming that cellular phone 114 is in a "live cell" area.

Figure 4A:
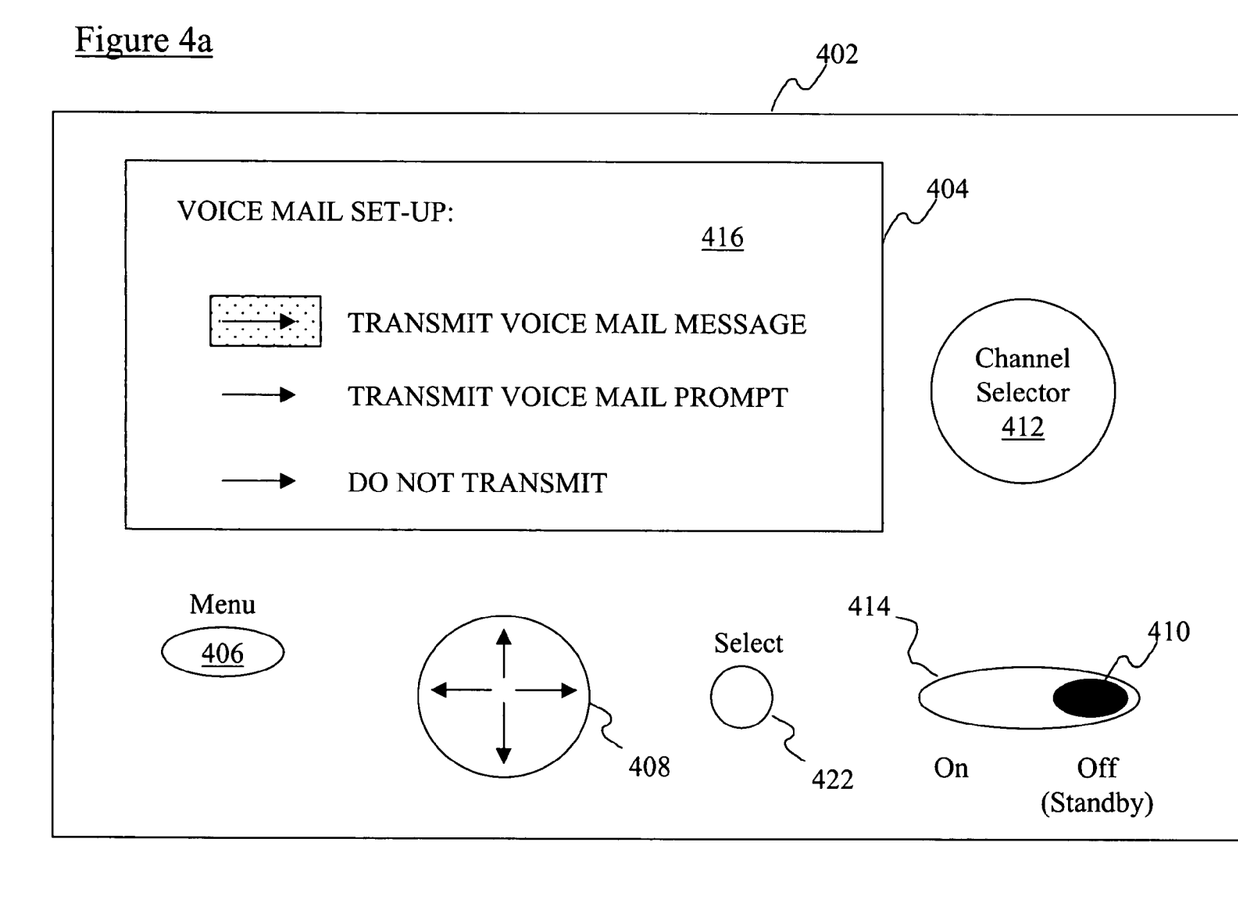
FIGS. 4a–b illustrate a control face of the modified satellite radio receiver, including a screen display showing an exemplary voice mail setup and a phone connection setup.

With reference now to FIG. 4a, there is depicted a control face 402 of voice mail receiver 300. Controls on control face 402 include a menu selector 406, a cursor controller 408, and a channel selector 412. Menu selector 406 selects a menu function, such as a voice mail set-up 416 shown in FIG. 4a or a phone connection type display 430, or other function displayed on a display 404 shown in FIG. 4b. Cursor controller 408 moves a highlighted area to a selected function of file, as discussed below. Channel selector 412 selects a particular public broadcast signal 310, and is also capable of selecting voice mail signal 312. Control face 402 also has an on/off control 414. When an on/off button is in the "ON" position, voice mail receiver can handle a voice mail message in several manners, including interrupting a public broadcast signal 310 being listened to with the voice mail message, storing the voice mail message for later listening through amplifier 316 and speaker 318, or rebroadcasting the voice mail message through repeater 322.

When the on/off button is in the "OFF" position, the recorder 320 records the voice mail message, which is rebroadcast by repeater 322 either immediately by automatically turning voice mail receiver 300 back on, or when voice mail receiver 300 is turned back on. Alternatively, the voice mail message is played through amplifier 316, again either immediately by automatically turning voice mail receiver 300 back on, or waiting until voice mail receiver 300 is manually turned on by a user.

Figure 4B:
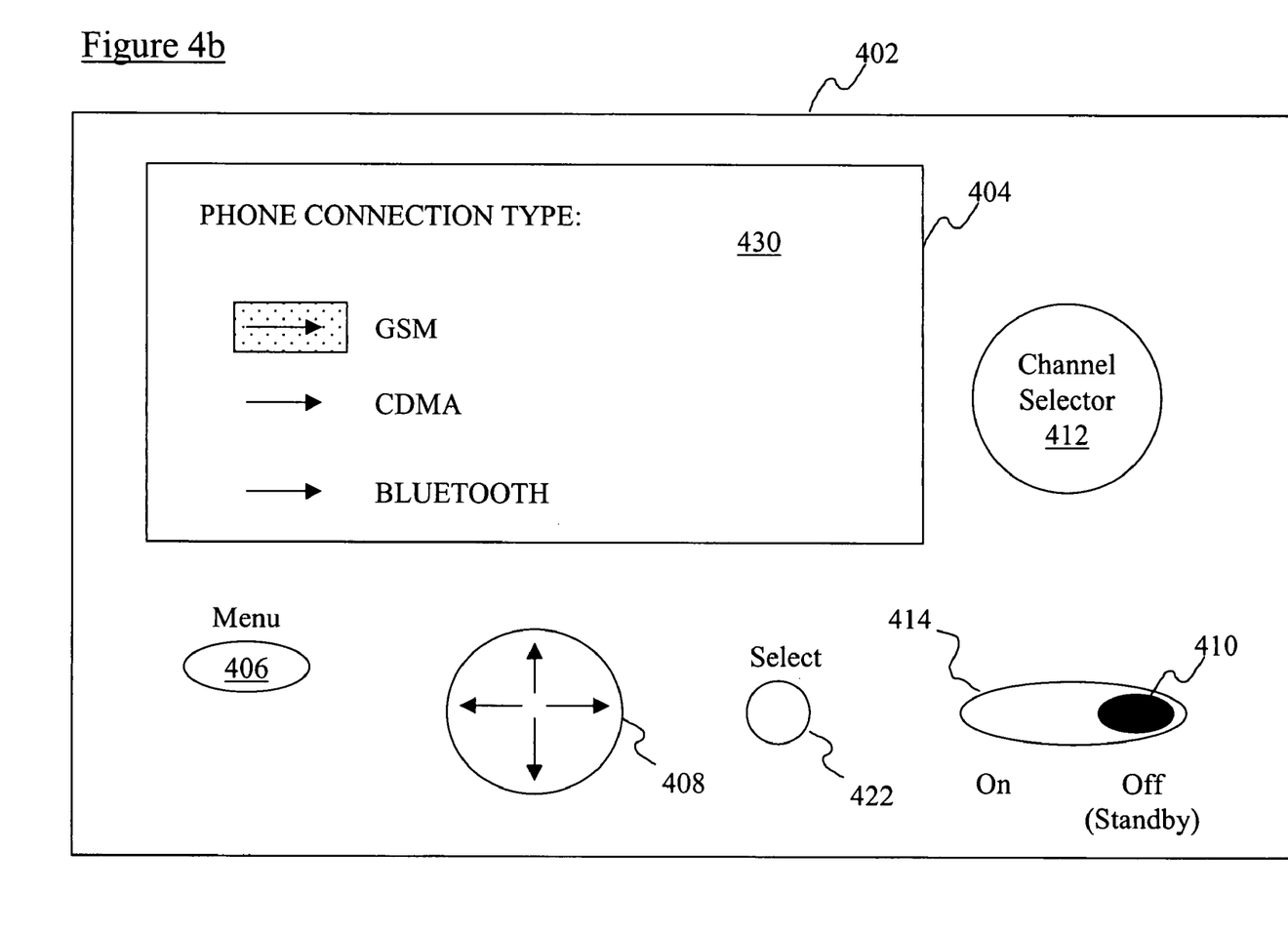

Referring now to FIG. 4b, a phone connection type display 430 is shown. Phone connection type display 430 presents different choices of what type of phone connection is to be used when re-transmitting a voice mail message to the cellular phone. For example, repeater 322 can be formatted to re-broadcast the recorded voice mail message in a global system for mobile communications (GSM) format, or a code division multiple access (CDMA) format, or a Bluetooth short-range format. If the user changes cellular phones and/or formats, then a different format is highlighted using cursor controller 408. That is, a user may change from a GMS phone to a CDMA phone, or the user may wish to utilize a Bluetooth capability of her phone in order to take advantage of the relatively short range of Bluetooth in order to minimize the chance of the message being "overhead" by another phone.

Figure 4C:
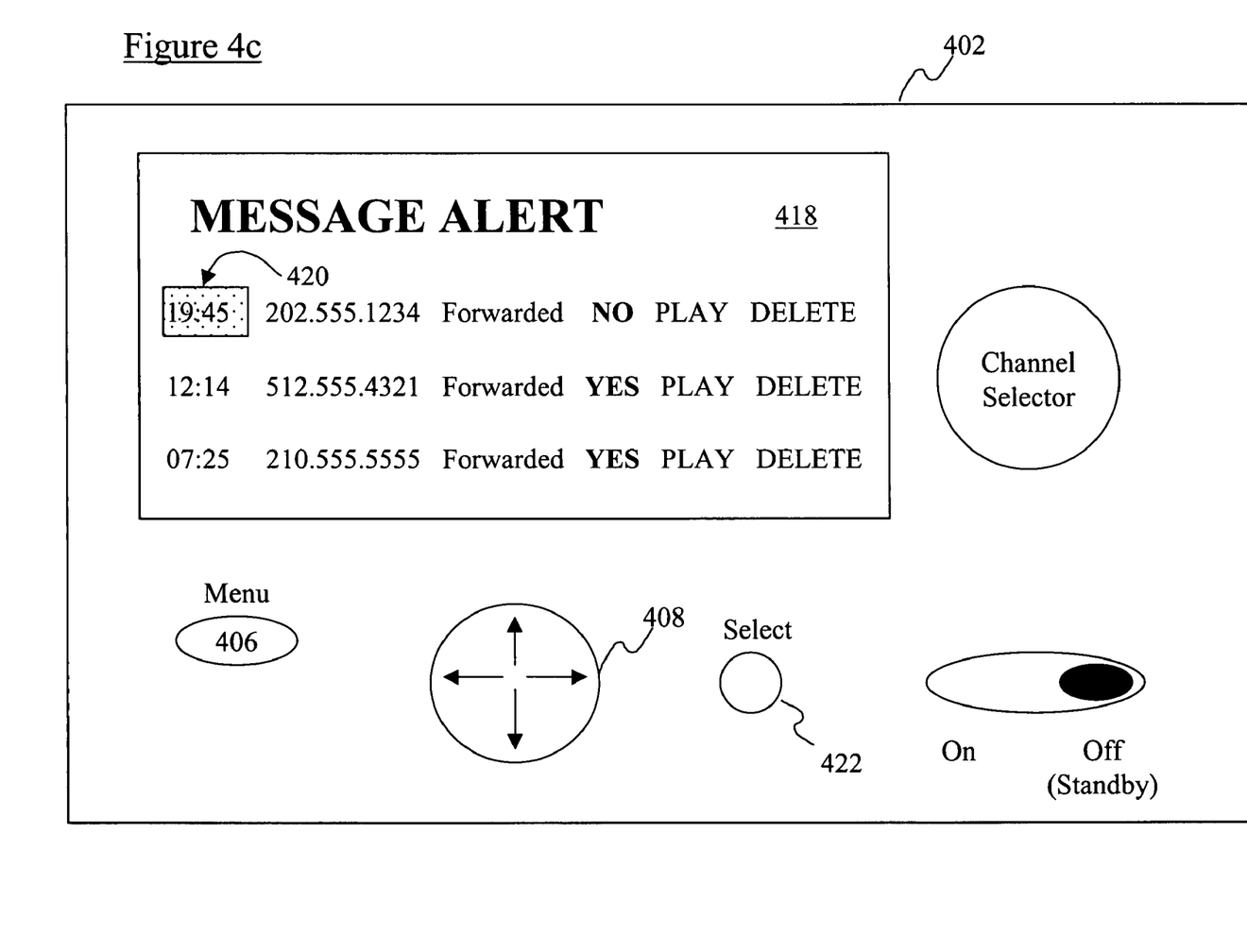
FIG. 4c depicts an exemplary display of messages on the screen display.

With reference now to FIG. 4c, display message 418 shows a message alert, as well as information about the voice mail message received. As shown, a message alert is displayed, showing the status of three voice mail messages. The most recent voice mail message, received at 19:45 (7:45 p.m.) has been highlighted by an activator highlight 420. Information in display message 418 shows not only when the most recent voice mail message was received, but also the telephone number of the caller (and/or optionally the name of the caller—not shown in the example), whether the voice mail message has been forwarded according to the protocol set up according to that discussed in FIG. 4a, and options to Play or Delete the message. The display message 418 may be automatically displayed when a new voice mail message arrives, and/or it may be displayed by selecting the screen using menu button 406.

The activator highlight 420 is moved about using cursor controller 408. For example, activator highlight 420 can be positioned over the "DELETE" display, and by pressing a select button 422, the voice mail will be deleted. Thus, the user has control over the file management of received voice mail messages.

Figure 5:
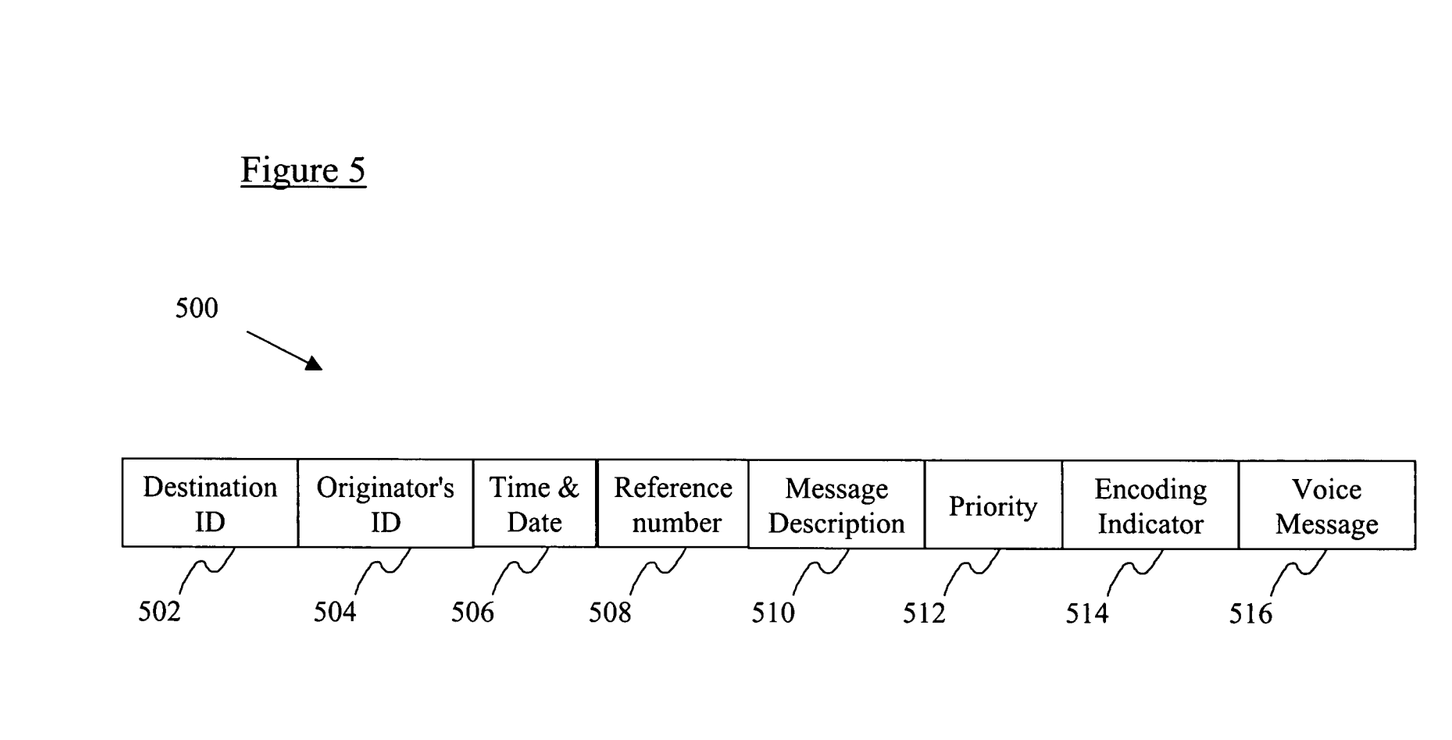
FIG. 5 illustrates a preferred format of the voice mail message.

With reference now to FIG. 5, there is displayed a preferred format of a satellite radio message waiting message 500. A destination field 502, identifies which satellite radio and cellular phone are to receive a voice message 516. That is, the destination field 502 must first identify which satellite radio is authorized to receive the voice message 516. If a particular satellite radio is not so authorized, as identified by a unique identification number of the satellite radio, then the entire message 500 is disregarded. If the satellite radio is authorized, then the message 500 is accepted, and the voice message 516 is stored and/or rebroadcast as described in this disclosure.

An originator field 504 identifies the caller, by phone number and/or name. A time field 506 identifies when the message was received. A reference number field 508 is an optional code field that may be used to identify which call from a same number is identified. A message description field 510 contains a short message, preferably less than 160 characters, describing the content of the voice mail. In a preferred embodiment, this short message is generated from a selected portion of the voice mail message using voice-to-text recognition software. A priority field 512 describes the voice mail message as being urgent, confidential, normal, etc. An encoding indicator field 514 defines the format of voice message 516, including "audible" encoding, MP3, text, etc.

While only the information from originator field 504 and time field 506 are shown in FIG. 4a, it is understood that information from any of the fields described in FIG. 5 may be displayed in display message 418.

Figure 6:
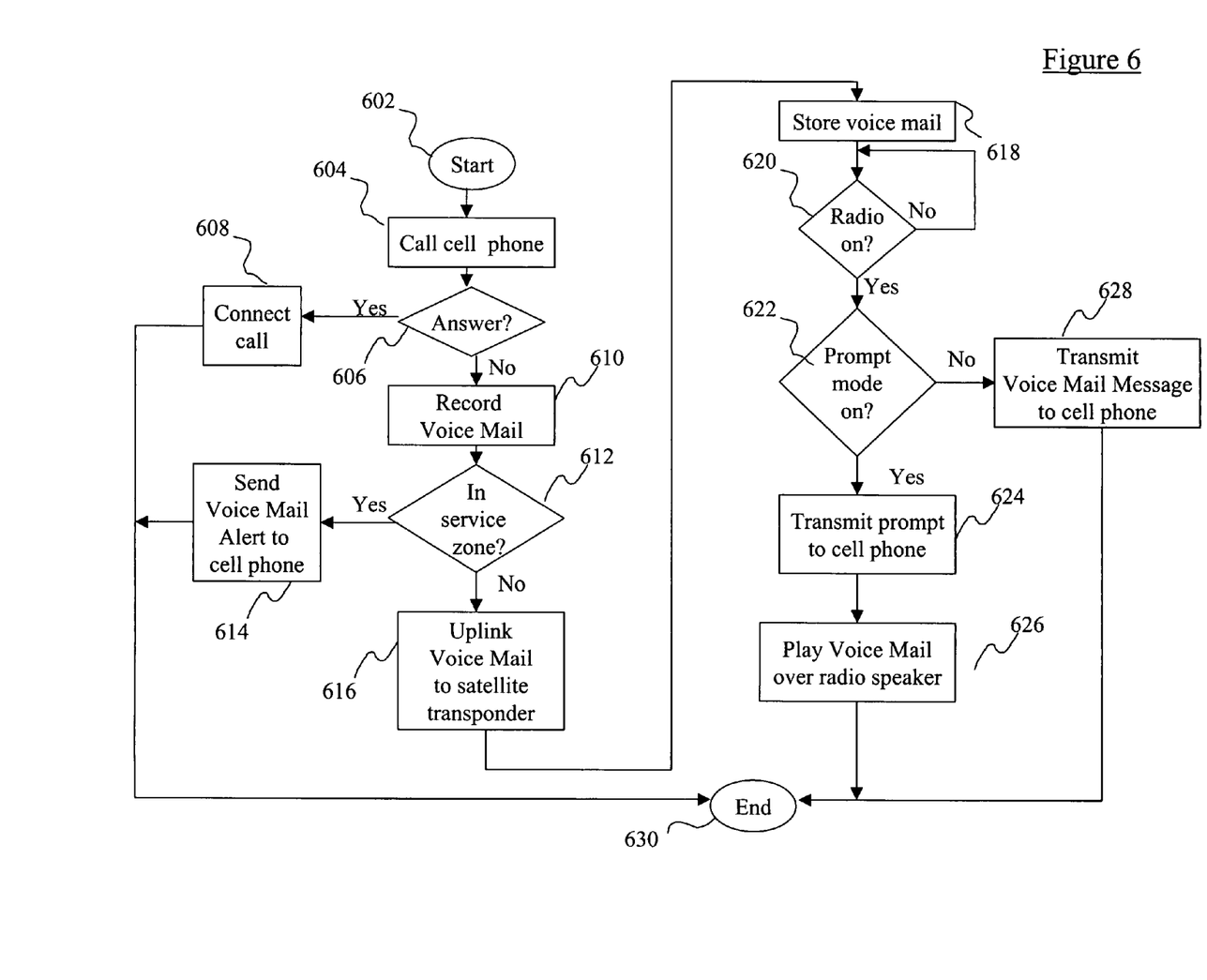
FIG. 6 is a high-level flow-chart of process steps taken in the present invention for receiving voice mail messages.

With reference now to FIG. 6, there is depicted a flow chart of a preferred embodiment of the steps followed by the present invention. Starting at initiator block 602, a call is first initiated to a cellular phone (block 604), as described using MTSO in FIG. 1. If the caller answers (query block 606), then the call is connected (block 608), and no further steps are taken. However, if the caller does not answer, then the caller is invited to record a voice mail message (block 610).

A query is then made (query block 612) to determine if the called cellular phone is within a service zone (is in a "live" cell in which the phone can communicate with a base station). If so, then a standard voice mail message alert is sent to the called cellular phone (block 614), instructing the user of the called cellular phone to call her service provider to retrieve her voice mail message. However, if the cellular phone is not within a "live" cell, then the voice mail message is uplinked to a satellite transponder (block 616) that services commercial satellite radios. The voice mail message includes satellite radio message waiting message 500, which defines which radio is authorized to receive the voice mail message. If the incoming voice mail message is not authorized to be received/recorded on the receiving satellite radio, then the voice mail message is disregarded (discarded). If the incoming voice mail message is authorized to be received/recorded on the radio, then the voice mail message is stored at the receiving radio (block 618), whether the radio is "ON" or in an "OFF" standby mode. That is, even if the radio is "OFF," it is still partially powered up to allow voice mail messages to be recorded.

If the satellite radio is turned off when the voice mail message arrives and is stored (query block 620), then the process remains on hold until the radio is turned on. If and when the radio is turned on, a query is made if a "prompt mode" has been initialized in the radio (query block 622). When in "prompt mode," the radio's repeater transmits a prompt signal to the local cellular phone (block 624), which prompts the user to highlight the "PLAY" option shown in FIG. 4b to hear the voice mail message (block 626).

If the radio is not in "prompt mode," then the repeater calls the cellular phone (block 628) by mimicking a base station, albeit a very low powered base station. The user answers the call, which automatically plays the voice mail message, preferably with a leading descriptor such as "The following is a voice mail message from phone number 202.555.1234, received at 19:45." The process then ends at a terminator 630.

Note that in a preferred embodiment the repeater uses a standard cellular phone format, such as code division multiple access (CDMA), global system for mobile communications (GSM) or time division multiple access (TDMA), thus mimicking a base station, the repeater may alternatively utilize a format such as 802.11b (Wi-Fi) or Bluetooth if the cellular phone is so enabled. Furthermore, the repeater may utilize a general packet radio service (GPRS) format if the caller is sending a message, either text or voice, via the Internet. Whatever format is utilized, in the preferred embodiment, the range of the repeater broadcasting the voice mail is limited, in order to comply with Federal Communications Commission (FCC) regulations, as well as minimizing power consumption by the repeater. The range is thus preferably less than 150', which is in line with range protocols for Wi-Fi and similar protocols. If using the Bluetooth protocol, a preferred embodiment utilizes a walkie-talkie feature on the cellular phone, allowing the cellular phone to be "called" utilizing a unique ring to identify an incoming call as a voice mail message from the satellite radio.

While a preferred embodiment shown in FIG. 6 describes the voice mail messages as being stored in recorder 320 shown in FIG. 3a, it is understood that the voice mail messages can alternatively be sent to and stored on on-board phone recorder 358 shown in FIG. 3b.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A system for receiving a voice mail message, the system comprising:
   a radio including:
      a receiver capable of receiving a public broadcast signal on a first frequency and a voice mail signal on a second frequency, the voice mail signal including a voice mail message,
      a demultiplexer capable of separating the signals on the first and second frequencies, and
      an output circuit capable of amplifying and sending the public broadcast signal to a public broadcast output, the public broadcast output coupled to an amplifier and speaker for audio reproduction of the public broadcast signal, the output circuit also capable of outputting the voice mail signal to a voice mail output;
   a recorder coupled to the voice mail output, the recorder including:
      an identifying means for identifying a voice mail message addressed to a specified cellular phone associated with the radio, and
      a recording means for recording only the voice mail message addressed to the specified cellular phone; and
   a repeater coupled to the recorder, the repeater capable of transmitting the recorded voice mail message addressed to the specified cellular phone.

2. The system of claim 1, wherein the voice mail message has been received from a satellite transponder, and wherein the voice mail message has been forwarded from a cellular telephone service provider to the satellite transponder.

3. The system of claim 1, wherein the voice mail signal initiates a prompt in the cellular phone, the prompt notifying a user that the voice mail message is stored in the recording means, and wherein the recording means is coupled to the amplifier and speaker for audio reproduction of the voice mail, such that the user is prompted to play the voice mail message in response to receiving the prompt on the cellular phone.

4. The system of claim 3, wherein the cellular phone emits a unique ring associated with the prompt notifying the user of the presence of the stored voice mail message.

5. The system of claim 1, wherein the identifying means discards voice mail signals that are not addressed to the specific user.

6. The system of claim 1, wherein the repeater transmits the voice message using a standard frequency for the cellular phone, and wherein the repeater transmits at a reduced power level such that the voice message is transmitted to a range of less than 2 miles.

7. The system of claim 1, wherein the repeater transmits the voice message using a Bluetooth format.

8. The system of claim 1, further comprising:
a standby power circuit including:
power selection means for providing a standby power to the system while in a standby mode, the standby power being less than a normal operating power for the system, and
selection means for receiving only the second frequency while the system is in the standby mode,
wherein the system is always in the standby mode when the system is not in a normal operating mode, such that the voice mail signal is received and recorded when the system is not in the normal operating mode.

9. A method for receiving a voice mail message, the method comprising:
receiving a public broadcast signal on a first frequency and a voice mail signal on a second frequency, the voice mail signal including a voice mail message,
separating the signals on the first and second frequencies, and
outputting the voice mail signal to a voice mail output;
identifying a voice mail message addressed to a specified cellular phone associated with the radio;
recording on a recorder only the voice mail message addressed to the specified cellular phone; and
transmitting, from a repeater coupled to the recorder, the recorded voice mail message addressed to the specified cellular phone.

10. The method of claim 9, wherein the voice mail message has been received from a satellite transponder, and wherein the voice mail message has been forwarded from a publicly switched telephone system to the satellite transponder.

11. The method of claim 9, wherein the voice mail message has been received from a satellite transponder, and wherein the voice mail message has been forwarded from a cellular telephone service provider to the satellite transponder.

12. The method of claim 9, wherein the voice mail signal initiates a prompt in the cellular phone, the prompt notifying a user that the voice mail message is stored in the recording means, and wherein the recording means is coupled to the amplifier and speaker for audio reproduction of the voice mail, such that the user is prompted to play the voice mail message in response to receiving the prompt on the cellular phone.

13. The method of claim 12, wherein the cellular phone emits a unique ring associated with the prompt notifying the user of the presence of the stored voice mail message.

14. The method of claim 9, wherein the identifying means discards voice mail signals that are not addressed to the specific user.

15. The method of claim 9, wherein the repeater transmits the voice message using a standard frequency for the cellular phone, and wherein the repeater transmits at a reduced power level such that the voice message is transmitted to a range of less than 2 miles.

16. The method of claim 9, wherein the repeater transmits the voice message using a Bluetooth format.

17. The method of claim 9, further comprising:
providing a standby power to the system while in a standby mode, the standby power being less than a normal operating power for the system; and
receiving only the second frequency while the system is in the standby mode, wherein the system is always in the standby mode when the system is not in a normal operating mode, such that the voice mail signal is received and recorded when the system is not in the normal operating mode.

18. A cellular phone capable of receiving voice mail messages, the cellular phone comprising an on-board phone recorder for recording a received voice mail message;
wherein the voice mail message is received from a system for transmitting the voice mail message, the system comprising:
a radio including:
a receiver capable of receiving a public broadcast signal on a first frequency and a voice mail signal on a second frequency, the voice mail signal including a voice mail message,
a demultiplexer capable of separating the signals on the first and second frequencies, and
an output circuit capable of amplifying and sending the public broadcast signal to a public broadcast output, the public broadcast output coupled to an amplifier and speaker for audio reproduction of the public broadcast signal, the output circuit also capable of outputting the voice mail signal to a voice mail output;
a recorder coupled to the voice mail output, the recorder including:
an identifying means for identifying a voice mail message addressed to a specified cellular phone associated with the radio, and
a recording means for recording only the voice mail message addressed to the specified cellular phone; and
a repeater coupled to the recorder, the repeater capable of transmitting the recorded voice mail message addressed to the specified cellular phone.

19. The cellular phone of claim 18, wherein the voice mail message is received directly from a base station of a cellular phone service provider.

* * * * *